2 Sheets—Sheet 1.

E. LYNCH.

Reciprocating Steam-Engine.

No. { 135, 1,239. }

Reissued Dec. 3, 1861.

Witnesses.
T. T. Everett
C. F. Myer

Inventor.
Edward Lynch

N. PETERS, PHOTO-LITHOGRAPHER, WASHINGTON, D. C.

2 Sheets—Sheet 2.

E. LYNCH.

Reciprocating Steam-Engine.

No. { 135, 1,239. }

Reissued Dec. 3, 1861.

Witnesses.
J. J. Everett.
H. S. Myer.

Inventor.
Edward Lynch.

N. PETERS, PHOTO-LITHOGRAPHER, WASHINGTON, D. C.

UNITED STATES PATENT OFFICE.

EDWARD LYNCH, OF WASHINGTON, DISTRICT OF COLUMBIA.

IMPROVEMENT IN STEAM-ENGINES.

Specification forming part of Letters Patent No. 23,594, dated April 12, 1859; Reissue No. 1,239, dated December 3, 1861.

*To all whom it may concern:*

Be it known that I, EDWARD LYNCH, of the city of Washington, in the District of Columbia, have invented certain new and useful Improvements in Steam-Engines for Driving Propellers; and I do hereby declare the following to be a full, clear, and exact description of the same, reference being had to the accompanying drawings and to the letters and marks thereon.

It is very important that the engines of ocean steamers, and particularly of naval steamers, should be below the water-line of the vessel, and should be compactly and conveniently arranged. When it is wished to drive propellers with a high degree of speed, the geared engine must necessarily be resorted to; but whether the geared engines or the direct-acting engines be used that arrangement which makes a compact engine and allows of free access to all its parts, and of easy and convenient movement around and about it, has always been very desirable.

My improvement is upon the geared engine, and is designed to drive a propeller with high speed.

The invention is one of arrangement of the various parts of an engine in relation to each other by which a very compact and efficient engine of easy access can be placed entirely below the water-line of the vessel. It is more specially designed for naval steamers and for the use of surface-condensers, but is applicable to all classes of vessels driven by propellers, and may be used with a jet-condenser, or even as a non-condensing engine.

Figure 1:
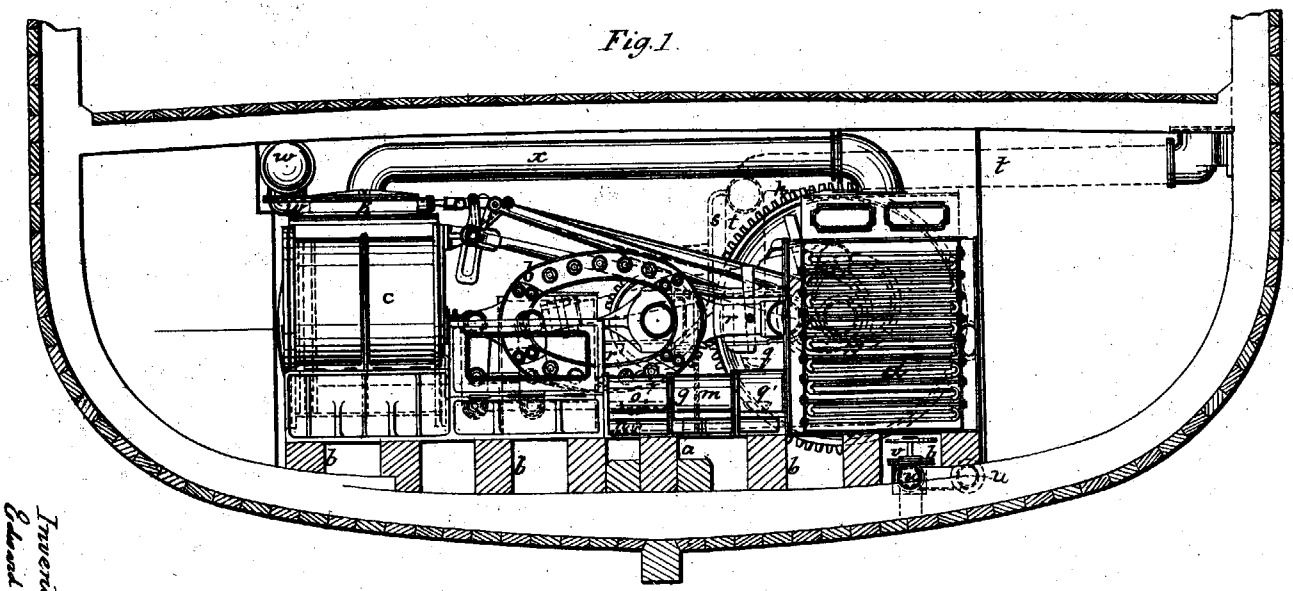
Figure 2:
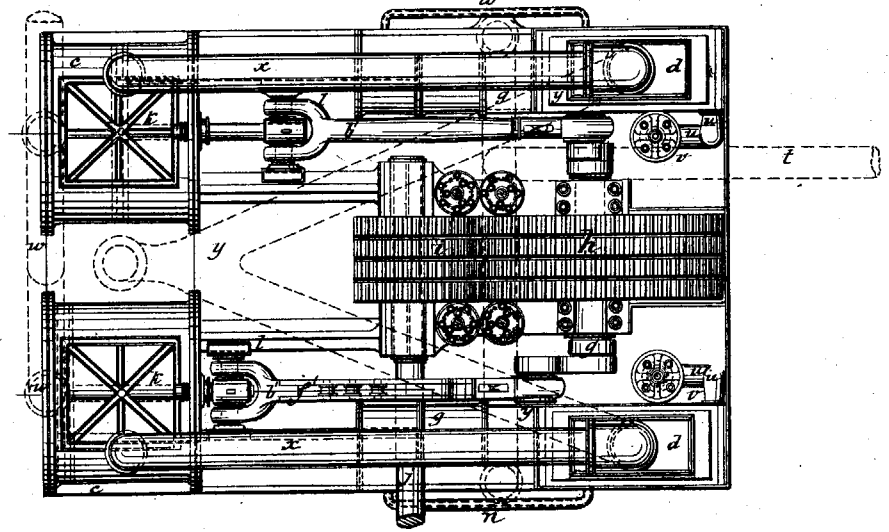

Of the drawings forming part of this specification, Figure 1 is a transverse section of a vessel near the stern, in which a side view of the engine is had; and Fig. 2 is a top view of the engine.

The first figure shows the various parts of the engine bedded firmly upon the keelson *a* and sustaining-timbers *b*, as generally used in supporting engines in ocean vessels. The arrangement will be seen to be made up of two cylinders, *c c*, of two condensers, *d d*, of two air-pumps, (the cylinders, condensers, and air-pumps having their necessary pipes, chests, and valves,) of two connecting-rods, *f f'*, of a crank-shaft, *g*, a driving-wheel, *h*, upon the crank-shaft, and of a pinion, *i*, upon the propeller-shaft *j*, and which gears into the driving-wheel. The valve-chests *k k* are shown by the drawings placed upon the upper side of the cylinders, the chests, as shown, being designed for slide-valves, which could be moved by direct attachment of their rods to the cross-heads *l l*, or by any other convenient means or in any other convenient way. The arrangement, however, allows of the valves being placed by the outer or inner sides of the cylinders, or between the two cylinders, as it also allows of the use of one valve to cover and control all the ports and passages of both cylinders. The arrangement also allows of the use of poppet or valves whose stems would play vertically or otherwise, or of any means for controlling the steam and exhaust which can be used in other engines. The condenser shown by the drawings is a surface-condenser, the tubes being used for circulating the water for condensing and the steam surrounding them, and, as will be seen, the condenser is made up of a series of tubes like a letter S compressed—thus: S—each tube being connected to and making joint with the tube-sheets of the condenser only at the ends of the letter; but any surface or the jet-condenser may be made to form part of my arrangement. I avoid the use, and of course the expense, of two single-acting pumps by the pump shown by the drawings, which is a double-acting pump, and is connected with the wells or receiving-chambers affixed to it, so that at one end it acts upon the condensing-water, while at the other end it acts upon the water of condensation, the partition between the two wells or water-chambers being indicated in Fig. 1, and marked *m*, the pipe or channel-way *n* conveying the water of condensation to the one chamber in communication with that end of the pump acting upon such water, the delivery-valve of which is marked *o* and the suction *o'*, and the channel in the plate *p* allowing the passage of the condensing-water to the other end of the pump, the delivery-valve of which is marked *q* and the suction-valve *q'*. The water of condensation will pass from the well *r'* as feed-water to the boiler by the action of this pump, or by any appropriate feed apparatus—an overflow-pipe from this well, marked *s*, conducting the excess to the out or overboard delivery-pipe *t*, this pipe *t* conducting the condensing-water from the well *r* into the ocean. Of the other parts shown by the drawings, and which have not heretofore been specially named, *u* indicates the inlet-pipe of the condensing-water; *v*, the injection-valve; *w*, the steam-pipe; *x*, the exhaust-pipe, and *y* the exhaust-pipe as it would be arranged when the valve or valves would be between the cylinders.

It will be perceived that the connecting-rod *f'* is in the form of a yoke. By so forming this connecting-rod I am enabled to place the cylinders by the side of each other, their rods running parallel, and have both of the cylinders on the same side of the propeller-shaft. The yoke, it will be noticed, surrounds the propeller-shaft, and has free and full movement about it. I am also enabled to have abundance of space on the other side of the shaft for the driving-wheel, crank-shaft, and other parts of the engine. The yoke is shown by the drawings as constructed of two pieces, each being attached at their ends to expanded ends of the connecting-rod, which are attached the one to the crank and the other to the cross-head. The object of thus making the yoke is to allow of its being taken apart whenever it may be desirable, as well as to fit it around the propeller-shaft when putting the engine in its place and adapting it to the shaft. Instead of making the yoke of the two pieces, as here shown, it may be so made that only one of its sides can be detached, or the connecting-rod may be so made as to have the yoke at one end open, and then by brasses be attached either to the crank or cross-head, or its form may be varied from that here shown, so long as ample room be given for its free movements around the propeller-shaft, and for its perfect connection with the cross-head and crank-shaft. As shown by the drawings, the pinion on the propeller-shaft will have two and a quarter revolutions to every one revolution of the driving-wheel, which is regarded as about the difference that should exist between the revolutions of the shaft of a direct-acting engine and a geared engine—*i. e.*, if the shaft would have with the direct engine forty revolutions in a minute, with the geared engine it would have ninety revolutions, but the relation of the pinion to the driving-wheel can so be settled as to give a greater or a less number of revolutions than are here named without requiring any change in the general arrangement of the engine.

Having thus fully set forth my invention, what I claim as new, and desire to secure by Letters Patent, is—

1. The arrangement of the several parts of the engine in their relation to each other and to the propeller-shaft, as herein set forth.

2. Constructing the connecting-rod of one of the cranks or cross-heads in the manner described, so as to allow of its surrounding the propeller-shaft, as herein described.

3. Using the opposite ends of the same double-acting pump for the air-pump and for the circulating-pump of a surface-condenser—that is, one end for the air-pump and one for the circulating-pump—substantially as described.

EDWARD LYNCH.

Witnesses:
THOS. T. EVERETT,
S. PIERCE.